United States Patent
Kakuta

(10) Patent No.: US 9,245,211 B2
(45) Date of Patent: Jan. 26, 2016

(54) IMAGE PROCESSING APPARATUS, METHOD OF CONTROLLING THE SAME, AND PROGRAM

(71) Applicant: CANON KABUSHIKI KAISHA, Tokyo (JP)

(72) Inventor: Hitoshi Kakuta, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/542,399

(22) Filed: Nov. 14, 2014

(65) Prior Publication Data

US 2015/0138606 A1    May 21, 2015

(30) Foreign Application Priority Data

Nov. 18, 2013   (JP) ................................ 2013-238322

(51) Int. Cl.
*H04N 1/40*     (2006.01)
*G06K 15/12*    (2006.01)
*H04N 1/409*    (2006.01)

(52) U.S. Cl.
CPC .......... *G06K 15/1223* (2013.01); *H04N 1/4092* (2013.01)

(58) Field of Classification Search
None
See application file for complete search history.

(56) References Cited

U.S. PATENT DOCUMENTS

| 8,384,954 | B2* | 2/2013 | Honma | 358/1.9 |
|---|---|---|---|---|
| 8,554,007 | B2* | 10/2013 | Hashimoto | 382/266 |
| 8,659,793 | B2* | 2/2014 | Takeishi | 358/1.9 |
| 8,670,158 | B2* | 3/2014 | Saka et al. | 358/3.22 |
| 2006/0072163 | A1* | 4/2006 | Ito et al. | 358/426.02 |
| 2006/0133679 | A1* | 6/2006 | Yoshida | 382/239 |
| 2009/0009779 | A1* | 1/2009 | Do | 358/1.9 |
| 2011/0164284 | A1* | 7/2011 | Dai | 358/3.06 |

FOREIGN PATENT DOCUMENTS

| JP | 2005-151064 A | 6/2005 |
|---|---|---|
| JP | 2006-157791 A | 6/2006 |

\* cited by examiner

*Primary Examiner* — Dung Tran
(74) *Attorney, Agent, or Firm* — Canon USA, Inc. IP Division

(57) ABSTRACT

An image processing apparatus includes a deciding unit configured to decide an attribute of each pixel contained in a bitmap from received print commands for printing a plurality of objects, a determination unit configured to determine whether each pixel of the generated bitmap is an edge pixel or not, and a changing unit configured to change the decided attribute of each pixel based on a result of the determination of whether the pixel is an edge pixel or not. The bitmap may be generated by drawing the plurality of objects.

8 Claims, 15 Drawing Sheets

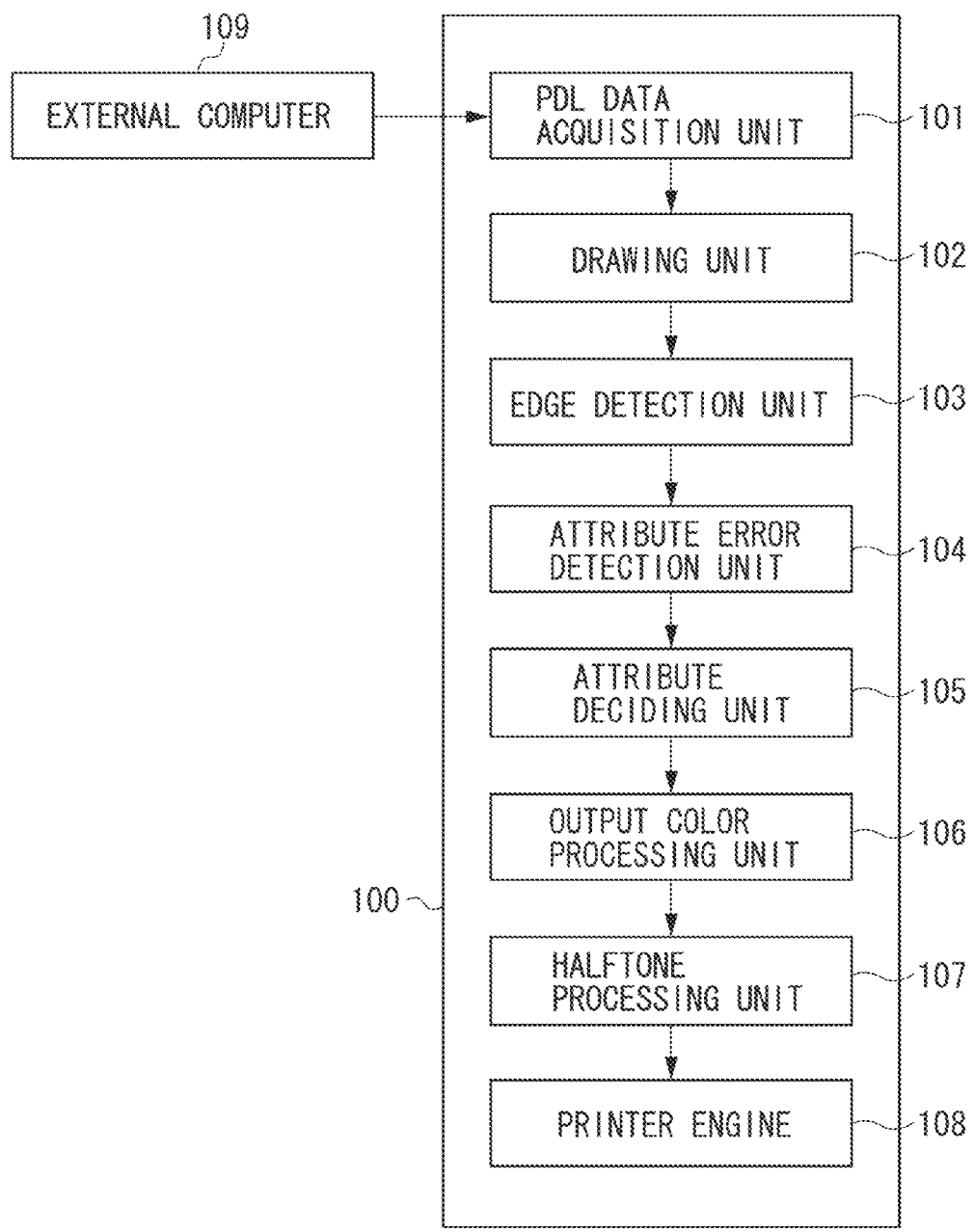

FIG. 2

| BIT 5 | 4 | 3 | 2 | | | 0 |
|---|---|---|---|---|---|---|
| OBJECT BIT | EDGE BIT | ATTRIBUTE ERROR BIT | ATTRIBUTE VALUE | | | |

OBJECT BIT

| 0x01 | OBJECT CONTAINED |
|---|---|
| 0x00 | NO OBJECT |

EDGE BIT

| 0x01 | EDGE |
|---|---|
| 0x00 | NO EDGE |

ATTRIBUTE ERROR BIT

| 0x01 | ATTRIBUTE ERROR CONTAINED |
|---|---|
| 0x00 | NO ATTRIBUTE ERROR |

ATTRIBUTE VALUE

| 0x07 | TEXT PROCESSING |
|---|---|
| 0x06 | INTERMEDIATE PROCESSING 6 |
| 0x05 | INTERMEDIATE PROCESSING 5 |
| 0x04 | INTERMEDIATE PROCESSING 4 |
| 0x03 | INTERMEDIATE PROCESSING 3 |
| 0x02 | INTERMEDIATE PROCESSING 2 |
| 0x01 | INTERMEDIATE PROCESSING 1 |
| 0x00 | PHOTOGRAPH PROCESSING |

FIG. 3A

| -9  | -15 | -24 | -15 | -9  |
|-----|-----|-----|-----|-----|
| -15 | 2   | 31  | 2   | -15 |
| -24 | 31  | 120 | 31  | -24 |
| -15 | 2   | 31  | 2   | -15 |
| -9  | -15 | -24 | -15 | -9  |

FIG. 3B

| -1 | 0 | 1 |
|----|---|---|
| -1 | 0 | 1 |
| -1 | 0 | 1 |

| -1 | -1 | -1 |
|----|----|----|
| 0  | 0  | 0  |
| 1  | 1  | 1  |

| -1 | -1 | 0 |
|----|----|---|
| -1 | 0  | 1 |
| 0  | 1  | 1 |

| 0 | -1 | -1 |
|---|----|----|
| 1 | 0  | -1 |
| 1 | 1  | 0  |

FIG. 3C

| 0 | 1  | 0 |
|---|----|---|
| 0 | -1 | 0 |
| 0 | 0  | 0 |

| 0 | 0  | 0 |
|---|----|---|
| 1 | -1 | 0 |
| 0 | 0  | 0 |

| 0 | 0  | 0 |
|---|----|---|
| 0 | -1 | 1 |
| 0 | 0  | 0 |

| 0 | 0  | 0 |
|---|----|---|
| 0 | -1 | 0 |
| 0 | 1  | 0 |

NO OBJECT AND PHOTOGRAPH PROCESSING
OBJECT CONTAINED AND PHOTOGRAPH PROCESSING
OBJECT CONTAINED AND TEXT PROCESSING

EDGE CONTAINED
NO EDGE

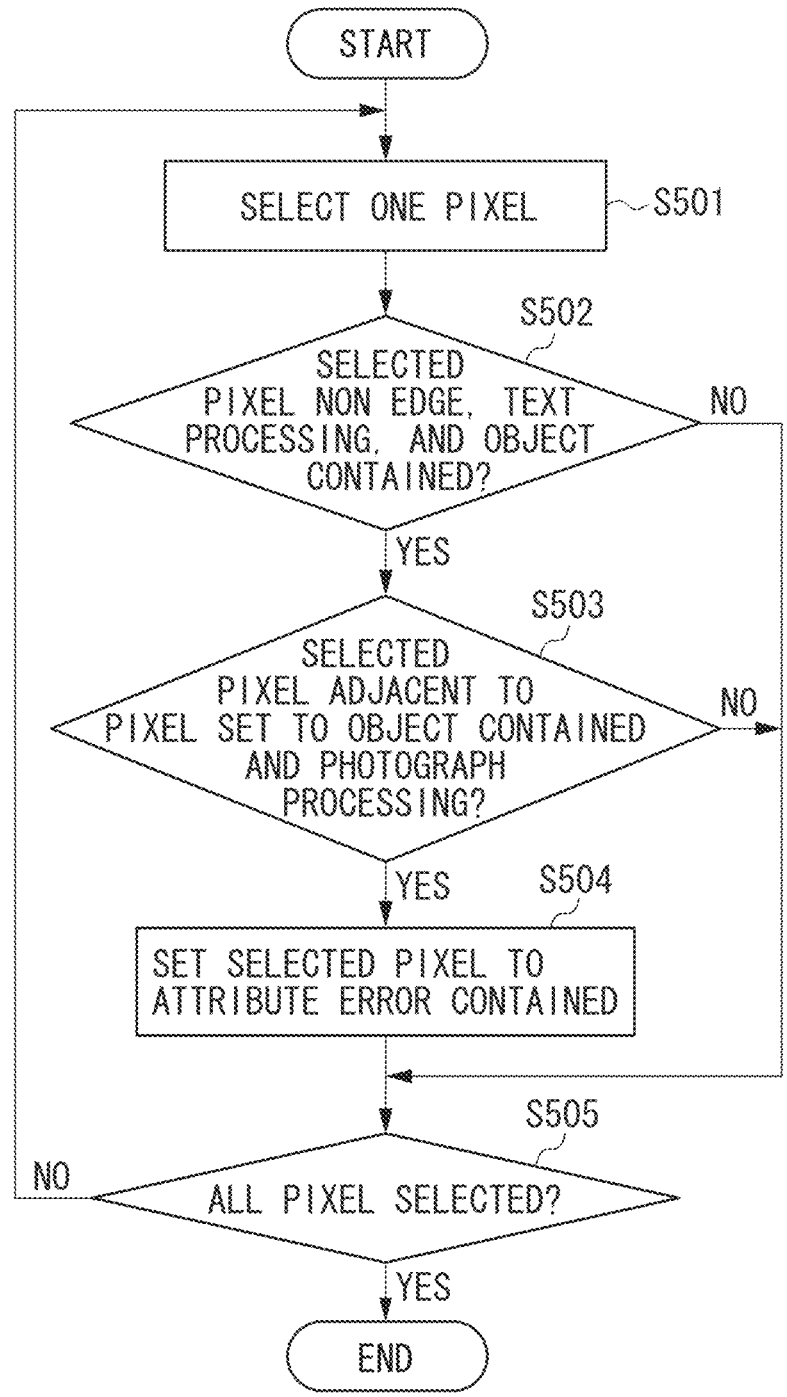

ATTRIBUTE ERROR CONTAINED

NO ATTRIBUTE ERROR

FIG. 6C

| CONVOLUTION VALUE | ATTRIBUTE |
|---|---|
| 0~3 | TEXT PROCESSING |
| 4~9 | INTERMEDIATE PROCESSING 6 |
| 10~17 | INTERMEDIATE PROCESSING 5 |
| 18~27 | INTERMEDIATE PROCESSING 4 |
| 28~36 | INTERMEDIATE PROCESSING 3 |
| 37~45 | INTERMEDIATE PROCESSING 2 |
| 46~49 | INTERMEDIATE PROCESSING 1 |
| 50~ | PHOTOGRAPH PROCESSING |

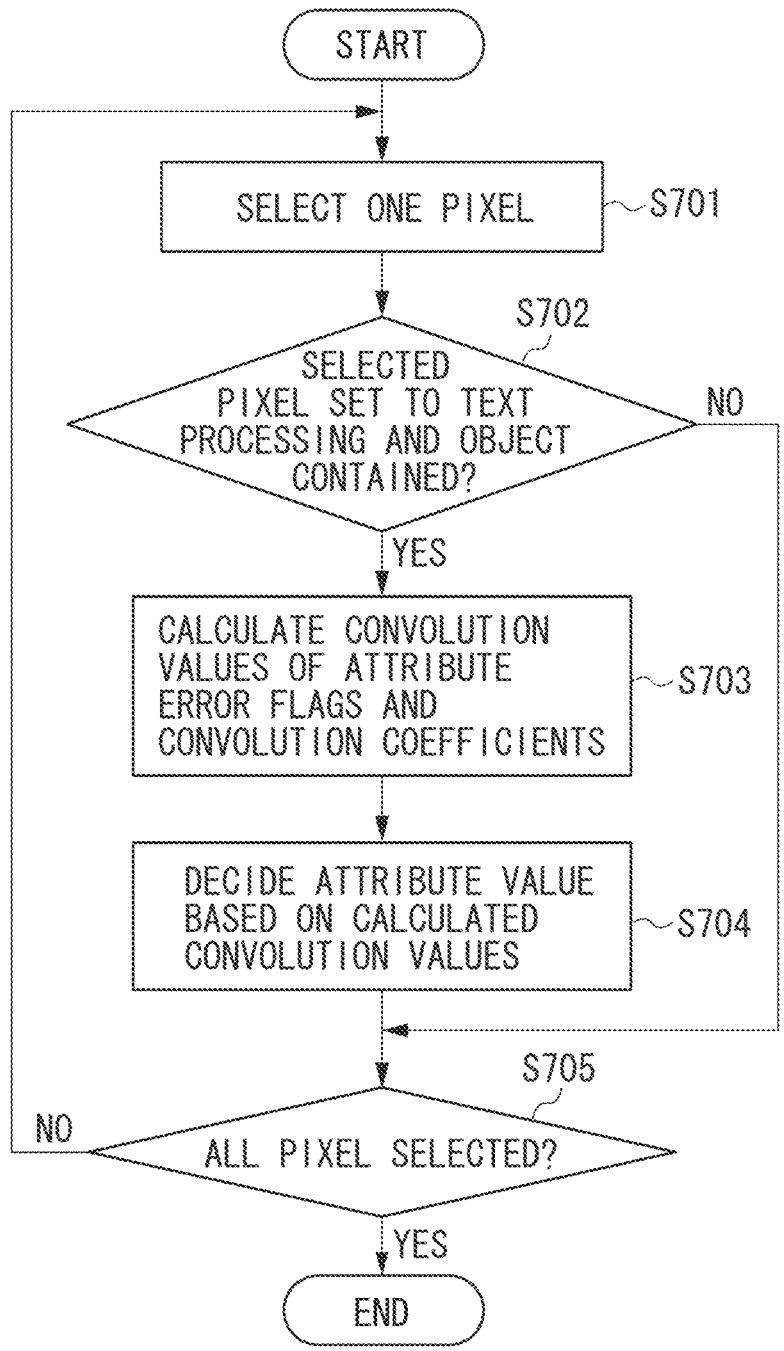

FIG. 8

| ATTRIBUTE | OUTPUT OF PHOTOGRAPH COLOR PROCESSING UNIT | OUTPUT OF TEXT COLOR PROCESSING UNIT |
|---|---|---|
| PHOTOGRAPH PROCESSING | 100% | 0% |
| INTERMEDIATE PROCESSING 1 | 86% | 14% |
| INTERMEDIATE PROCESSING 2 | 71% | 29% |
| INTERMEDIATE PROCESSING 3 | 67% | 43% |
| INTERMEDIATE PROCESSING 4 | 43% | 67% |
| INTERMEDIATE PROCESSING 5 | 29% | 71% |
| INTERMEDIATE PROCESSING 6 | 14% | 86% |
| TEXT PROCESSING | 0% | 100% |

OBJECT CONTAINED AND PHOTOGRAPH PROCESSING

OBJECT CONTAINED AND PHOTOGRAPH PROCESSING

NO OBJECT AND PHOTOGRAPH PROCESSING

EDGE CONTAINED

NO EDGE   EDGE CONTAINED

ATTRIBUTE ERROR CONTAINED

NO ATTRIBUTE ERROR

FIG. 11C

| CONVOLUTION VALUE | ATTRIBUTE |
|---|---|
| 0~3 | TEXT PROCESSING |
| 4~9 | INTERMEDIATE PROCESSING 6 |
| 10~17 | INTERMEDIATE PROCESSING 5 |
| 18~27 | INTERMEDIATE PROCESSING 4 |
| 28~36 | INTERMEDIATE PROCESSING 3 |
| 37~45 | INTERMEDIATE PROCESSING 2 |
| 46~49 | INTERMEDIATE PROCESSING 1 |
| 50~ | PHOTOGRAPH PROCESSING |

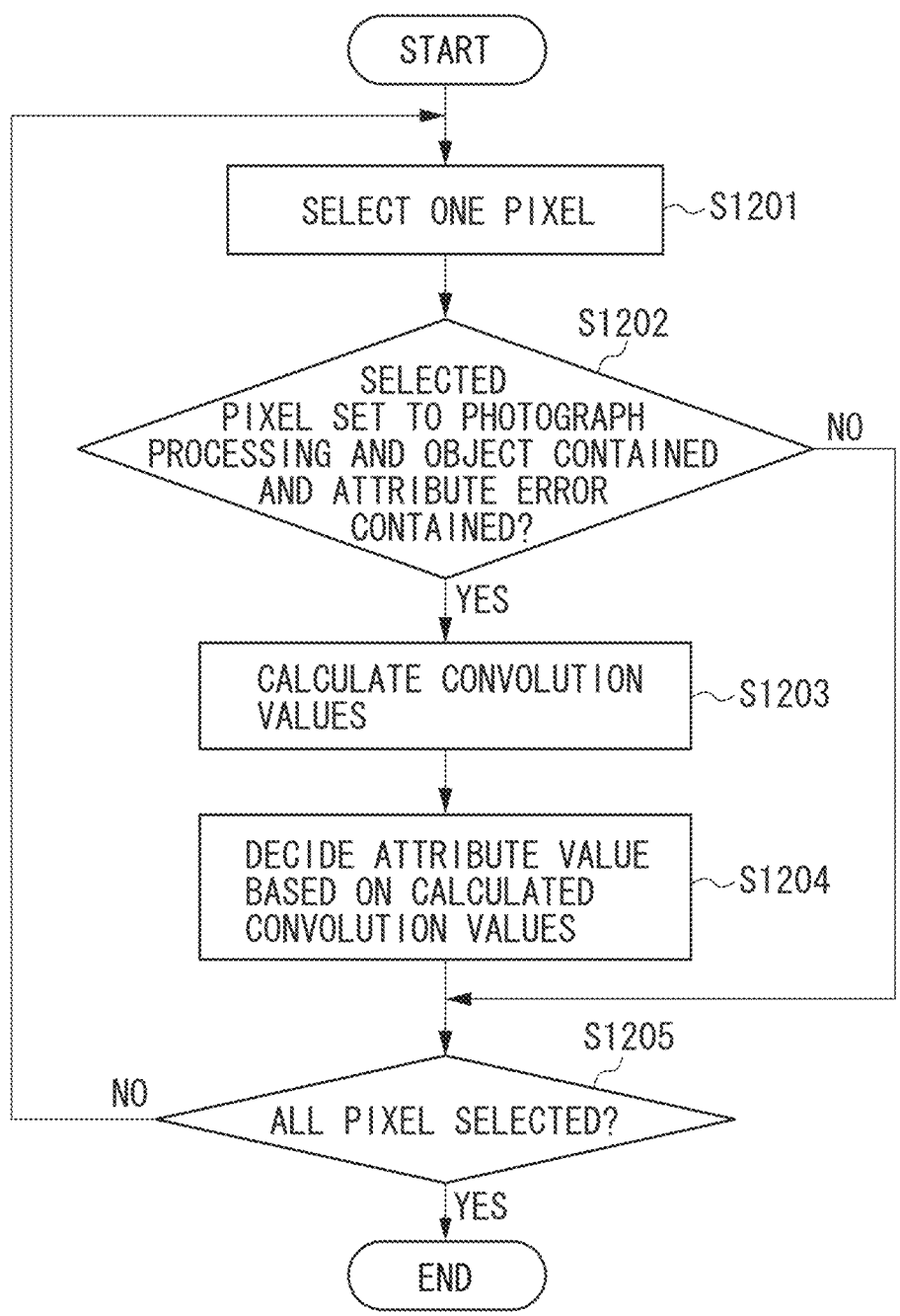

IMAGE PROCESSING APPARATUS, METHOD OF CONTROLLING THE SAME, AND PROGRAM

BACKGROUND OF THE INVENTION

1. Field of the Invention

The present invention relates to an image processing apparatus, a method of controlling the same, and a program.

2. Description of the Related Art

There is an image processing apparatus that receives from a personal computer (PC) page description language (PDL) data of a single page including draw commands for drawing a plurality of objects, rasterizes the objects into a memory of a single page, and prints a drawing image of the single page that is obtained by the rasterization. Such an image processing apparatus determines attributes (text or photograph) of the objects from the draw commands for the objects and executes image processing according to the determination result.

For example, with respect to an area of the drawing image in which an object having a text attribute exists, the image processing apparatus executes image processing to reproduce gray (R=G=B) using only a K toner. On an area of the drawing image in which an object having a photograph attribute exists, the image processing apparatus executes image processing to reproduce gray using CMYK toners (Japanese Patent Application Laid-Open No. 2006-157791).

However, there are cases where an attribute of an object that is determined from a print command for printing the object is inappropriate.

SUMMARY OF THE INVENTION

According to an aspect of the present invention(s), an image processing apparatus and/or an image processing system includes a receiving unit configured to receive print commands for printing a plurality of objects, a generation unit configured to draw the plurality of received objects to generate a bitmap, a deciding unit configured to decide an attribute of each pixel contained in the bitmap, from the received print commands for the respective objects, a determination unit configured to determine whether each pixel contained in the generated bitmap is an edge pixel or not, and a changing unit configured to change the decided attribute of each pixel based on a result of the determination of whether the pixel is an edge pixel or not. Methods for controlling one or more image processing apparatuses or systems and a computer-readable medium storing a program that causes a computer to execute a method for controlling an image processing apparatus and/or system are also provided.

Further features of the present invention will become apparent from the following description of exemplary embodiments with reference to the attached drawings.

BRIEF DESCRIPTION OF THE DRAWINGS

FIG. 1 is a configuration diagram illustrating an image processing apparatus according to an exemplary embodiment.

FIG. 2 illustrates an example of a data structure of an attribute image according to an exemplary embodiment.

FIGS. 3A, 3B, and 3C respectively illustrate examples 1, 2, and 3 of a filter of an edge detection unit according to an exemplary embodiment.

FIG. 5 illustrates a flow chart of the attribute error detection unit according to the first exemplary embodiment.

FIGS. 6A, 6B, and 6C illustrate a method by which an attribute deciding unit decides an attribute according to the first exemplary embodiment.

FIG. 7 is a flow chart of the attribute deciding unit according to the first exemplary embodiment.

FIG. 8 illustrates mixing percentages of an output color processing unit according to an exemplary embodiment.

FIGS. 11A, 11B, and 11C each illustrate a method by which attribute deciding unit decides an attribute according to the second exemplary embodiment.

FIG. 12 is a flow chart of the attribute deciding unit according to the second exemplary embodiment.

DESCRIPTION OF THE EMBODIMENTS

Figure 4A:
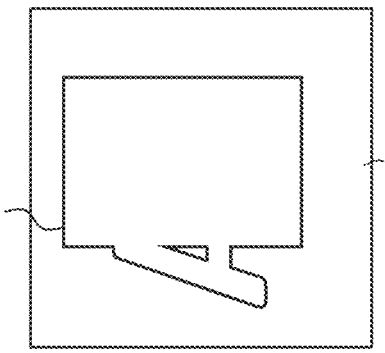
FIGS. 4A, 4B, 4C, 4D, 4E, and 4F respectively illustrate portions detected by an attribute error detection unit 104 according to a first exemplary embodiment.

Various exemplary embodiments, features, and aspects of the invention will be described in detail below with reference to the drawings.

The first exemplary embodiment describes an example of an image processing apparatus that reduces a difference in image processing between text and photograph of the same color.

FIG. 1 illustrates the configuration of the image processing apparatus according to the present exemplary embodiment. An image processing apparatus 100 includes a PDL data acquisition unit 101, a drawing unit 102, an edge detection unit 103, an attribute error detection unit 104, an attribute deciding unit 105, an output color processing unit 106, a halftone processing unit 107, and a printer engine 108.

The image processing apparatus 100 includes therein a central processing unit (CPU), a read-only memory (ROM), and a random-access memory (RAM). The CPU loads a program for the image processing apparatus 100 from the ROM and executes the program for the image processing apparatus 100 using the RAM as a temporary storage area. The image processing apparatus 100 performs the foregoing operations to execute the processing of each unit (101 to 107).

When the PDL data acquisition unit 101 receives PDL data from an external computer 109, the PDL data acquisition unit 101 outputs the PDL data to the drawing unit 102. The PDL data is data including draw commands (also referred to as "print command") for drawing a plurality of objects. The drawing unit 102 generates a drawing image (bitmap) and an attribute image based on the PDL data received from the PDL data acquisition unit 101. The attribute image is an image containing the same numbers of pixels as those of the drawing image in a vertical and horizontal direction. The attribute image can contain information about the presence/absence of an object, the presence/absence of an edge, and/or the presence/absence of an attribute error in each pixel as well as attribute values based on the draw commands (FIG. 2). The edge detection unit 103 receives the drawing image and the attribute image from the drawing unit 102 and detects an edge from the drawing image (the edge detection unit 103 detects a pixel constituting an edge, i.e., edge pixel). Then, the edge detection unit 103 sets a flag indicating that an edge is contained, to a pixel of the attribute image that corresponds to the edge pixel. The attribute error detection unit 104 receives the drawing image and the attribute image from the edge detection unit 103. Then, the attribute error detection unit 104 detects from the drawing image the pixels in which text and photograph of the same color are adjacent to each other, and the attribute error detection unit 104 sets a flag indicating that an attribute error is contained, to pixels of the attribute image that correspond to the detected pixels. The attribute deciding unit 105 receives the drawing image and the attribute image from the attribute error detection unit 104 and changes the attribute values of the pixels to which the flag indicating that an attribute error is contained is set. The output color processing unit 106 receives the drawing image and the attribute image from the attribute deciding unit 105 and executes color processing on each pixel of the drawing image based on the attribute image. In this way, a CMYK image is generated. The halftone processing unit 107 converts the multivalued CMYK image received from the output color processing unit 106 into a binary CMYK image and outputs the binary CMYK image to the printer engine 108. Lastly, based on the binary CMYK image received from the halftone processing unit 107, the printer engine 108 forms toners of the respective colors on an output medium such as a sheet.

The following describes details of the attribute image. The attribute image is an image containing the same numbers of vertical and horizontal pixels as those of the drawing image. The attribute image contains information (flags) used for changing the image processing that is to be executed on each pixel. FIG. 2 illustrates an example of the data structure of the attribute image according to the present exemplary embodiment. In the example illustrated in FIG. 2, a single pixel of the attribute image contains 6-bit information including 1-bit object bit, 1-bit edge bit, 1-bit attribute error bit, and 3-bit attribute value. A pixel with the object bit set to 1 is a pixel on which an object is drawn by the drawing unit 102. A pixel with the object bit set to 0 is a pixel on which no object is drawn. A pixel with the edge bit set to 1 is a pixel that constitutes an edge on the drawing image. A pixel with the edge bit set to 0 is a pixel that does not constitute an edge on the drawing image. A pixel with the attribute error bit set to 1 is a text pixel that is adjacent to a photograph of the same color on the drawing image. A pixel with the attribute error bit set to 0 is a pixel other than the text pixel that is adjacent to a photograph of the same color on the drawing image. The attribute value indicates image processing for text (hereinafter, text processing), image processing for photograph (hereinafter, photograph processing), or intermediate image processing between the text processing and the photograph processing that is to be applied to a pixel. The intermediate image processing includes multiple levels. Intermediate processing 1 applies processing close to the photograph processing, whereas intermediate processing 6 applies processing close to the text processing.

The following describes details of the drawing unit 102. The drawing unit 102 executes initialization processing on every pixel of the attribute image prior to the drawing. Specifically, the drawing unit 102 sets the object bit of every pixel to "no object" (0), the edge bit to "no edge" (0), the attribute error bit to "no attribute error" (0), and the attribute value to "photograph processing" (0x00). After the initialization processing, the drawing unit 102 receives PDL data from the PDL data acquisition unit 101 and generates a drawing image and an attribute image from the PDL data.

The following describes details of the generation of an attribute image. When generating the attribute image, the drawing unit 102 sets the object bit of a pixel of the drawing image on which an object is to be drawn to "object contained" (1). In a case where the object is a text object or a line object, the drawing unit 102 sets the attribute value of the pixel on which the object is to be drawn to "text processing" (0x07). In a case where the object to be drawn on the pixel is an object other than a text object or a line object or no object is to be drawn on the pixel, the attribute value of the pixel remains "photograph processing" (0x00). As to a pixel on which multiple objects are to be drawn, the drawing unit 102 overwrites the drawing image and the attribute image with information of a draw command for an object that is to be drawn last on the pixel. In other words, in a case where a photograph object is to be drawn on a pixel after a text object is drawn on the pixel, the colors (RGB values) of the photograph object are written to the pixel on the drawing image, and the pixel on the attribute image is set to "object contained" (1) and "photograph processing" (0x00).

The following describes details of the edge detection unit 103. The edge detection unit 103 executes edge detection on the drawing image and sets the edge flag of a pixel from which an edge is detected to "edge contained" (1). On the other hand, the edge flag of a pixel from which no edge is detected remains "no edge" (0). For example, the edge detection unit 103 applies an edge detection filter to each of the colors R, G, and B of the drawing image to obtain edge amounts. Then, the edge detection unit 103 calculates the sum of squares of the edge amount of each color and executes threshold determination on the calculated value. A pixel having a value greater than a threshold (pixel determined as having a value greater than the threshold) is an edge pixel, whereas a pixel having a value equal to or smaller than the threshold is not an edge pixel. The edge detection filters used by the edge detection unit 103 are not limited. For example, the edge detection unit 103 may use a space filter illustrated in FIG. 3A, a differentiation filter illustrated in FIG. 3B, or a filter illustrated in FIG. 3C for making comparisons with adjacent pixels. Further, the color space that the edge detection unit 103 uses to execute the edge detection is not limited. The edge detection unit 103 may use a grayscale color space, CMYK space, or L*a*b* space. In other words, the edge detection unit 103 may convert the drawing image in the RGB color space into a different color space and then executes the edge detection. In the case where the edge detection unit 103 executes the edge detection in the L*a*b* space, it is desirable to execute the edge detection only on the L-component. In this case, it is not necessary to calculate the sum of squares of the edge amount, and the edge amount obtained by applying the edge detection filter to the L-component may be compared directly with the threshold. The same applies to a case of using the grayscale color space.

Figure 4B:
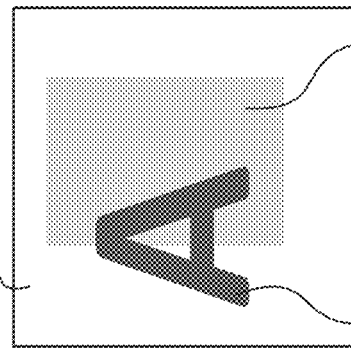

The following describes the attribute error detection unit 104. The attribute error detection unit 104 detects a pixel in which no edge exists although the attribute value is changed. More specifically, the attribute error detection unit 104 detects a text pixel having the same color as an adjacent pixel that is a photograph pixel. The detection of such a pixel is executed to avoid a situation in which completely different types of color processing are applied to adjacent pixels, e.g., the color processing for text is applied to a focused pixel while the color processing for photograph is applied to a pixel adjacent to the focused pixel. In this way, generation of a border between pixels of the same color on a printed matter can be prevented. FIG. 4A illustrates an example in which a rectangle is drawn and the text "A" is drawn over the rectangle with the same color. FIG. 4B illustrates the object flags and the attribute values of the attribute image. Note that the attribute value of the pixel on which the text and the rectangle overlap, is "text processing."

Figure 4C:
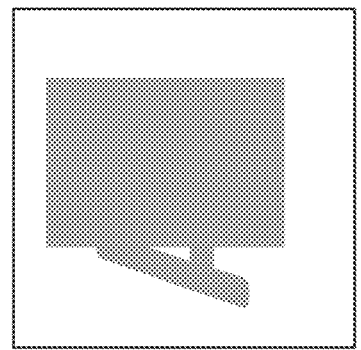
Figure 4D:
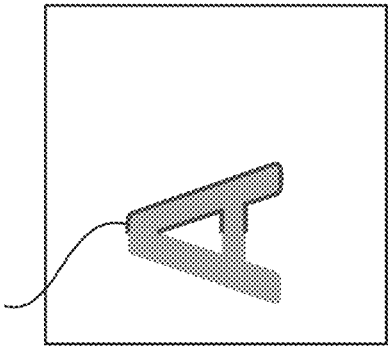

FIG. 4C illustrates the edge flags of the attribute image. A pixel at a boundary between the rectangle and the text is "no edge," because the drawing image does not contain an edge. FIG. 4D illustrates the attribute error flags detected by the attribute error detection unit 104. The attribute error detection unit 104 sets to "attribute error contained" the attribute error flag of a portion in which no edge exists although the attribute value is changed.

The following describes details of the processing of the attribute error detection unit 104 (i.e., processing to obtain the state illustrated in FIG. 4D) with reference to the flow chart illustrated in FIG. 5.

Figure 4E:
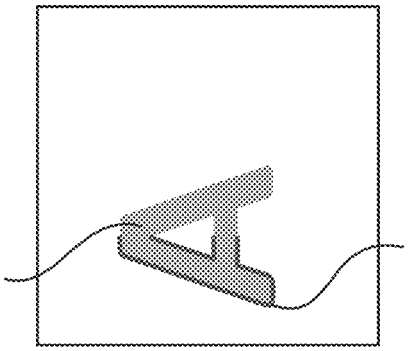

In step S501, the attribute error detection unit 104 selects pixels one by one starting from the upper left pixel. In step S502, the attribute error detection unit 104 determines whether the edge bit of the selected pixel is "no edge," whether the attribute value of the selected pixel is "text processing," and whether the object bit of the selected pixel is "object contained." In FIG. 4E, a pixel determined as true in step S502 is in light gray. A pixel set to "edge," "text processing," and "object contained" is in dark gray.

Figure 4F:
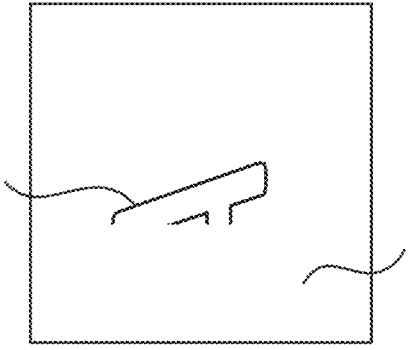

If the determination result in step S502 is true (light gray portion) (YES in step S502), then in step S503, the attribute error detection unit 104 determines whether four pixels that are vertically or horizontally adjacent to the selected pixel include a pixel that the object flag is "object contained" and the attribute value is "photograph processing." If the determination result in step S503 is true (YES in step S503), the attribute error detection unit 104 sets the attribute error flag of the selected pixel to "attribute error contained." A pixel that is determined as true in step S503 is in dark color in FIG. 4F. In this way, the pixels in dark color in FIG. 4D (pixels of "attribute error contained") are successfully identified.

On the other hand, if the determination result in step S502 is false (NO in step S502) or if the determination result in step S502 is true but the determination result in step S503 is false (NO in step S503), the attribute error detection unit 104 does not change the attribute error flag of the selected pixel (the attribute error flag remains "no attribute error").

In step S505, the attribute error detection unit 104 determines whether all the pixels are selected. If not all the pixels are selected (NO in step S505), then in step S501, the attribute error detection unit 104 selects an unprocessed pixel. The attribute error detection unit 104 executes the foregoing steps S501 to S505 on every pixel so that the attribute error flags of the text pixels having the same color as that of an adjacent pixel that is a photograph pixel are changed to "attribute error contained."

The following describes the processing of the attribute deciding unit 105, with reference to FIG. 6. The attribute deciding unit 105 changes, among the pixels with the attribute value set to "text processing" and the object bit set to "object contained", the attribute values of pixels set to "attribute error contained" and the attribute values of pixels in a neighborhood of the pixels set to "attribute error contained", to the intermediate processing 1, 2, 3, 4, 5, or 6 or the photograph processing. The attribute deciding unit 105 changes the attribute values such that the closer the pixel is to a pixel set to "attribute error contained" or the larger the number of pixels set to "attribute error contained" surrounding the pixel, the processing closer to the photograph processing is performed. In the foregoing way, the attribute values of the pixels around the pixels set to "attribute error contained" are gradually switched between the photograph processing and the text processing by the attribute deciding unit 105.

Figures 6A, 6B:
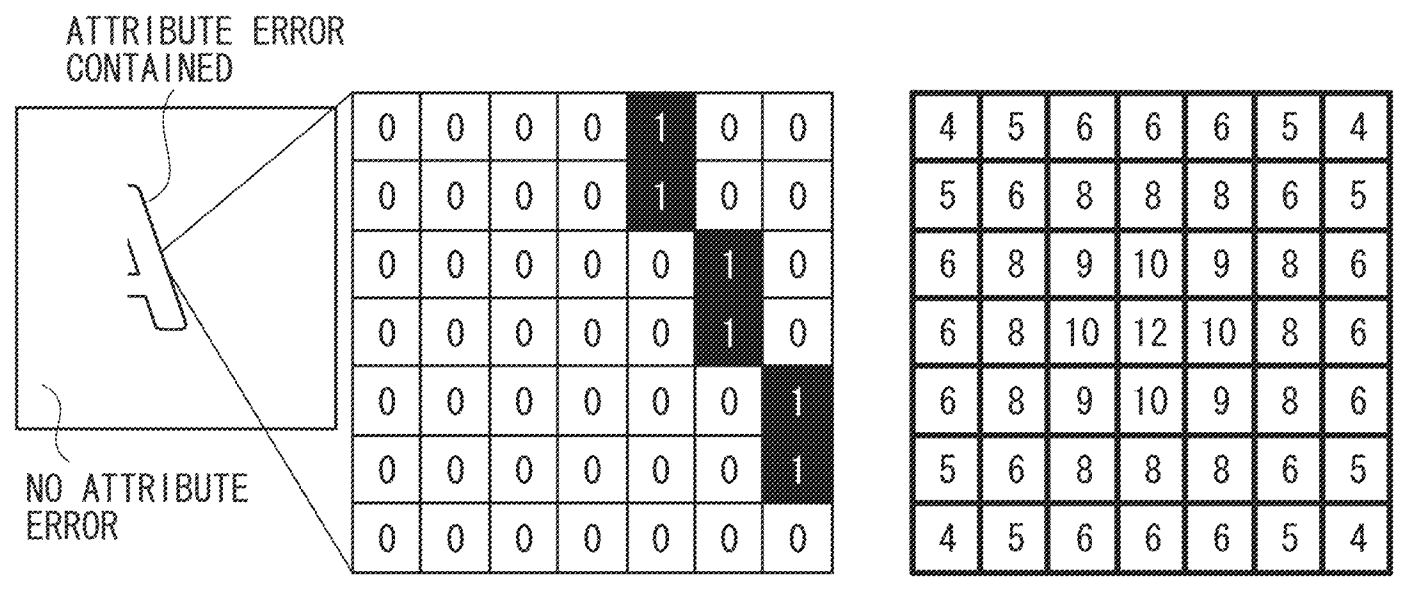

The left part of FIG. 6A is the same as that of FIG. 4D. The attribute deciding unit 105 selects text pixels one by one starting from the upper left text pixel and, as illustrated in the right part of FIG. 6A, the attribute deciding unit 105 extracts a 7×7 window surrounding the selected pixel (the pixel at the center of the 7×7 window is a focused pixel). Then, the attribute deciding unit 105 calculates convolution values of the extracted 7×7 pixels and convolution coefficients specified in FIG. 6B and executes threshold determination on the convolution values to decide the attribute values. FIG. 6C illustrates a threshold determination table. The attribute deciding unit 105 changes the attribute value of a selected pixel with a smaller convolution value to an attribute value closer to the text processing, whereas the attribute deciding unit 105 changes the attribute value of a selected pixel with a greater convolution value to an attribute value closer to the photograph processing, because a pixel that is closer to a pixel set to "attribute error contained" and is surrounded by a larger number of pixels set to "attribute error contained" has a greater convolution value. The attribute deciding unit 105 executes the foregoing processing on each pixel.

The following describes details of the processing of the attribute deciding unit 105, with reference to FIG. 7. FIG. 7 is a flow chart of the attribute deciding unit 105. In step S701, the attribute deciding unit 105 selects pixels one by one starting from the upper left pixel. If the determination result in step S702 is true (YES in step S702), then in step S703, the attribute deciding unit 105 calculates convolution of the attribute error flags and the convolution coefficients of the selected pixel and the surrounding pixels. In step S704 following step S703, the attribute deciding unit 105 decides an attribute value based on the calculation results and changes the attribute value of the selected pixel to the decided attribute value. On the other hand, if the determination result in step S702 is false (NO in step S702), the attribute deciding unit 105 does not change the attribute value of the selected pixel. In step S705, the attribute deciding unit 105 determines whether all the pixels are selected. If not all the pixels are selected (NO in step S705), then in step S701, the attribute deciding unit 105 selects an unprocessed pixel. The attribute deciding unit 105 executes the foregoing steps S701 to S705 on every pixel to change the attribute values of the pixel set to "attribute error contained," and the attribute values of the pixels in the neighborhood of the pixels set to "attribute error contained" among the pixels with the attribute value set to "text processing" and the object bit set to "object contained", to any of the intermediate processing 1, 2, 3, 4, 5, or 6 or the photograph processing.

The following describes details of the output color processing unit 106. The output color processing unit 106 includes a text color processing unit, a photograph color processing unit, and a mixed processing unit. The output color processing unit 106 executes color processing on each pixel of the drawing image based on the attribute value to generate a CMYK image. Specifically, the output color processing unit 106 executes the following processing. (1) The output color processing unit 106 selects pixels one by one starting from the upper left pixel and inputs the color values of the selected pixel to the text color processing unit and the photograph color processing unit. (2) Next, the output color processing unit 106 inputs the outputs from the text color processing unit and the photograph color processing unit and the attribute value of the pixel to the mixed processing unit. (3) The output color processing unit 106 uses the color values output from the mixed processing unit as a color processing result of the selected pixel.

The output color processing unit 106 executes the foregoing processing on each pixel and outputs the results as CMYK data.

The text color processing unit and the photograph color processing unit each convert input color values (RGB values) into CMYK color values based on a color gamut of the device. For example, in a case where color values close to gray (e.g., color values in which differences between R and G, G and B, and B and R are each equal to or smaller than a threshold value) are input, the text color processing unit converts the input color values to a color value of K toner only (i.e., C=M=Y=0, 0<=K). On the other hand, even in the case where color values close to gray are input, the photograph color processing unit converts the color values to color values to be reproduced with three CMY colors or four CMYK colors (i.e., 0<C, 0<M, 0<Y). The mixed processing unit calculates a weighted average of two input CMYK color values based on the attribute value of the pixel and outputs the calculated weighted average.

FIG. 8 illustrates an example of mixing ratios used by the mixed processing unit. For pixels with the attribute value closer to the text processing, the percentage of the output of the text color processing is set higher, whereas the percentage of the output of the photograph color processing is set lower. On the other hand, for pixels with the attribute value closer to the photograph processing, the percentage of the output of the photograph color processing is set higher, whereas the percentage of the output of the text color processing is set lower. Specifically, for example, in a case where the output of the photograph color processing unit is C, M, Y, K=C1, M1, Y1, and K1 and the output of the text color processing unit is C, M, Y, K=C2, M2, Y2, K2, the output of the mixed processing unit is C, M, Y, K=$\alpha$C1+(1−$\alpha$)C2, $\alpha$M1+(1−$\alpha$)M2, $\alpha$Y1+(1−$\alpha$)Y2, and $\alpha$K1+(1−$\alpha$)K2, where $\alpha$ denotes an output percentage of the photograph color processing unit (e.g., 86%).

According to the present exemplary embodiment, the closer a text pixel is situated to a photograph pixel, the processing closer to the photograph processing is executed on the text pixel having the same color as the photograph pixel. In this way, a sudden change in color at a border between text and photograph of the same color can be prevented.

The second exemplary embodiment will describe an example of an image processing apparatus that executes processing close to text, on text within an image area. The only difference between the first and second exemplary embodiments is the processing of the attribute error detection unit 104 and the processing of the attribute deciding unit 105 in the image processing apparatus 100. The following describes the processing of the attribute error detection unit 104 and the processing of the attribute deciding unit 105 according to the second exemplary embodiment.

The following describes the attribute error detection unit 104. The attribute error detection unit 104 detects a pixel with the attribute value set to "photograph" that has the same color as its surrounding pixels. In other words, the attribute error detection unit 104 detects a pixel identified as a photograph pixel, as the attribute image although the pixel appears as text or a line to a human eye. The attribute error detection unit 104 detects such a pixel to prevent a situation that a gray text sent as an image (for example, in a case where a bitmap of text is attached to PPT, the text is sent as an image) by a draw command is reproduced with all CMYK colors. This prevents color from appearing around gray text on a printed matter.

Figure 9A:
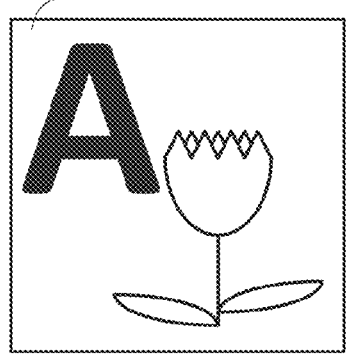
FIGS. 9A, 9B, 9C, and 9D respectively illustrate portions detected by an attribute deciding unit according to a second exemplary embodiment.
Figure 9B:
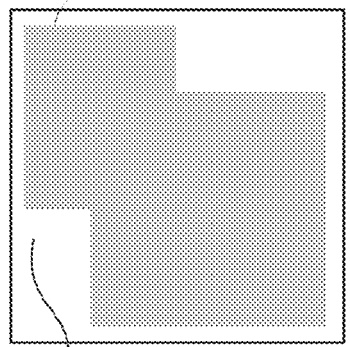
Figure 9C:
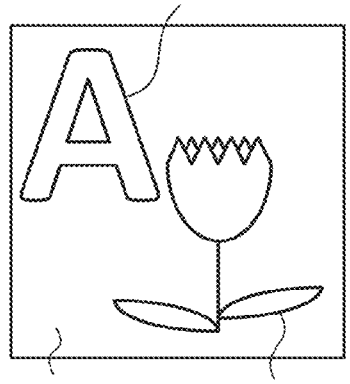
Figure 9D:
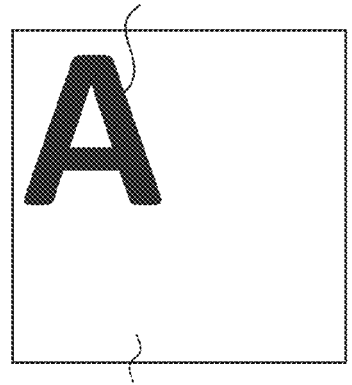

FIG. 9A illustrates an example in which an image draw command for drawing a rectangle containing text and a draw command for drawing a rectangle containing a photograph are sent. FIG. 9B illustrates the object flags and the attribute values of the attribute image. In the rectangle area, the attribute value is "photograph attribute" (attribute of photograph processing). FIG. 9C illustrates the edge flags of the attribute image. A pixel of a boundary of the text and a pixel constituting an edge in the photograph are acquired as edges (a method for the edge acquisition is similar to that in the first exemplary embodiment). FIG. 9D illustrates the attribute error flags detected by the attribute error detection unit 104. The attribute error detection unit 104 sets the attribute error flag of a photograph pixel having the same color as its surrounding pixels to "attribute error contained."

Figure 10:
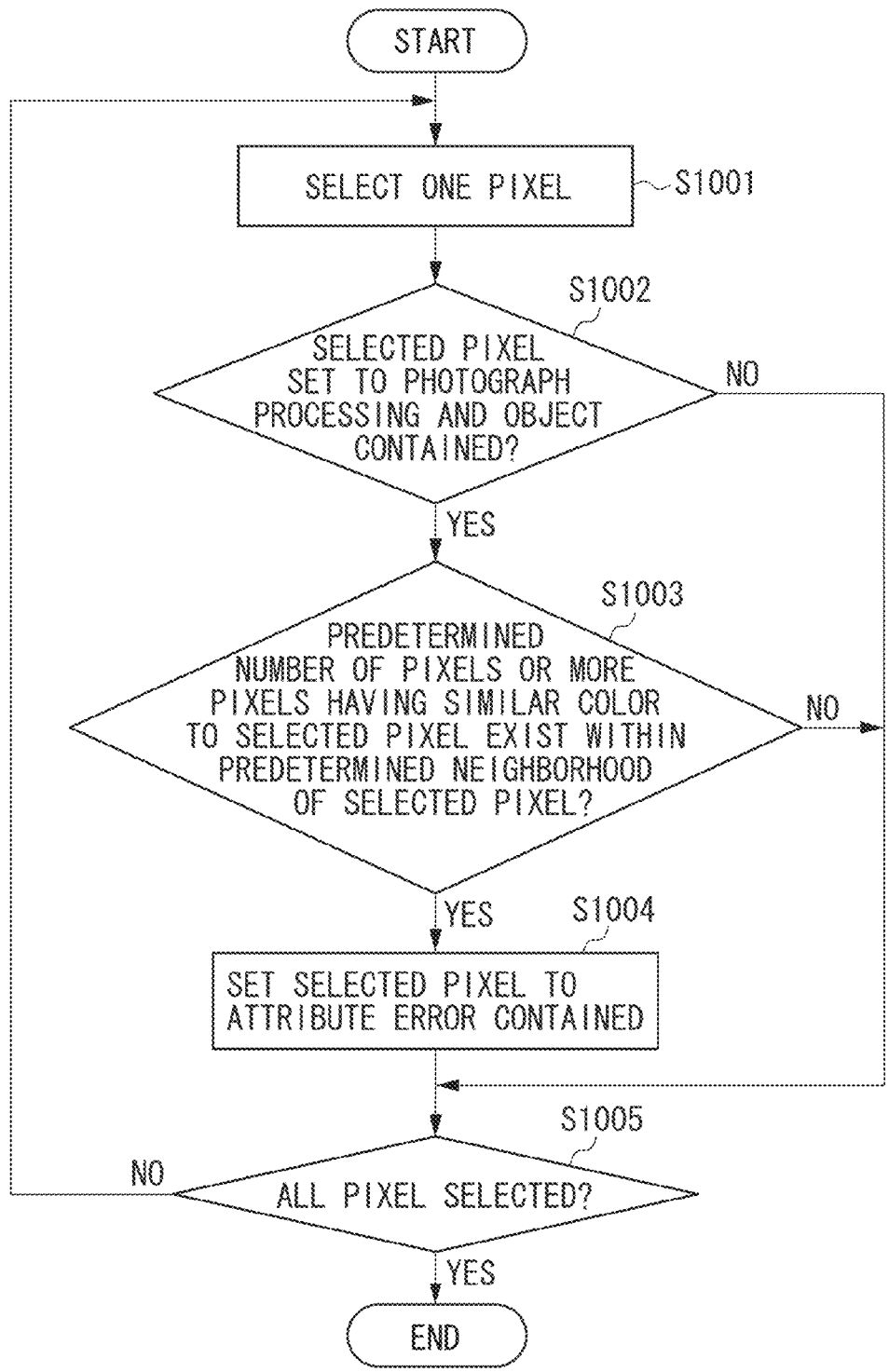
FIG. 10 is a flow chart illustrating an attribute error detection unit according to the second exemplary embodiment.

The following describes details of the processing of the attribute error detection unit 104, with reference to the flow chart illustrated in FIG. 10. In step S1001, the attribute error detection unit 104 selects pixels one by one starting from the upper left pixel. In step S1002, the attribute error detection unit 104 determines whether the attribute value of the selected pixel is "photograph processing" and whether the object bit of the selected pixel is "object contained."

If the determination result in step S1002 is true (YES in step S1002), then in step S1003, the attribute error detection unit 104 determines whether the number of pixels having a similar color to the selected pixel and existing within a predetermined neighborhood of the selected pixel is equal to or larger than a predetermined number. In step S1003, it may be determined, for example, whether five or more pixels having the same color as that of the selected pixel exist within a 5×5 window including the selected pixel at the center. If the determination result in step S1003 is true (YES in step S1003), the attribute error detection unit 104 changes the attribute error flag of the selected pixel to "attribute error contained."

On the other hand, if the determination result in step S1002 is false (NO in step S1002) or if the determination result in step S1002 is true but the determination result in step S1003 is false (NO in step S1003), the attribute error detection unit 104 does not change the attribute error flag of the selected pixel (the attribute error flag remains "no attribute error").

In step S1005, the attribute error detection unit 104 determines whether all the pixels are selected. If not all the pixels are selected (NO in step S1005), then in step S1001, the attribute error detection unit 104 selects an unprocessed pixel. The attribute error detection unit 104 executes the foregoing steps S1001 to S1005 on every pixel so that the attribute error flag of every pixel with the attribute value set to "photograph" that has the same color as its surrounding pixels is set to "attribute error contained."

The important point about the attribute error detection unit 104 is to set the attribute error flag of a photograph pixel having the same color as its surrounding pixels to "attribute error contained," and the flow illustrated in FIG. 10 is a mere example. For example, a flow including the following steps (1) to (5) may be employed.

(1) Find a pixel set to "object contained," "photograph processing," and "edge."

(2) Find all pixels contained within an area surrounded by the found pixels (the surrounded area needs to be a closed area formed by continuous pixels that are set to "object contained" and "photograph processing" and are edge pixels).

(3) Whether every one of the pixels is a pixel set to "object contained" and "photograph processing" is determined.

(4) If it is determined that every one of the pixels is a pixel set to "object contained" and "photograph processing," then it is determined whether all the colors of the pixels are the same as those of the pixels forming the closed area and found in step (1).

(5) If it is determined that the colors are the same, every one of the pixels (i.e., pixels found in steps (1) and (2)) is set to "attribute error contained." Furthermore, the edge pixels forming the closed area surrounding all the pixels found in steps (1) and (2) are set to "attribute error contained."

The following describes the processing of the attribute deciding unit 106.

The attribute deciding unit 106 changes every pixel set to "attribute error contained" from "photograph processing" to "text processing." In this way, the text processing is applied to the text within the rectangle sent by the image draw command.

The following describes another example of the processing of the attribute deciding unit 106.

The attribute deciding unit 106 changes every R=G=B pixel, among the pixels set to "attribute error contained," from "photograph processing" to "text processing." In this way, the text processing is applied to a gray text within the rectangle sent by the image draw command.

The following describes another example of the processing of the attribute deciding unit 106.

The attribute deciding unit 106 changes the attribute value of each pixel set to "attribute error contained" and "edge," among the pixels with the attribute value set to "photograph processing" and the object bit set to "object contained," to any of text processing and intermediate processing 1, 2, 3, 4, 5, or 6. The attribute deciding unit 106 also changes the attribute value of each pixel that is located close to the foregoing pixels and set to "attribute error contained", to any of text processing and intermediate processing 1, 2, 3, 4, 5, or 6. At this time, the attribute deciding unit 106 changes the attribute values such that the closer the pixel is to an edge pixel and the larger the number of edge pixels surrounding the pixel, the processing closer to the text processing is executed.

The following describes details of the processing of the attribute deciding unit 105, with reference to FIG. 11.

Figures 11A, 11B:
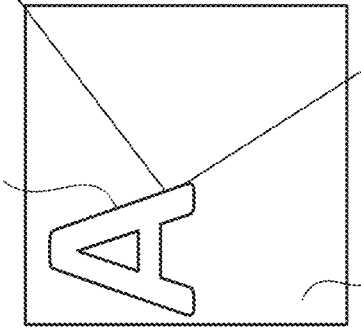

The left part of FIG. 11A illustrates the attribute error flags of a case where text and photograph are both drawn by an image draw command. The attribute deciding unit 105 selects photograph pixels one by one starting from the upper left photograph pixel and, as illustrated in the right part of FIG. 11A and extracts a 7×7 window surrounding the selected pixel. The attribute value of an edge pixel that is set to "attribute error contained" is 1, and the attribute value of any other pixel is 0.

Next, the attribute deciding unit 105 calculates convolution values of the attribute values of the extracted 7×7 pixels and convolution coefficients specified in FIG. 11B and makes a threshold determination on the convolution values to decide the attribute value of the selected pixel.

FIG. 11C illustrates a threshold determination table. The attribute deciding unit 105 changes the attribute value of a selected pixel with a smaller convolution value to an attribute value closer to the photograph processing (i.e., farther from a pixel that is set to "attribute error contained" and "edge"), whereas the attribute deciding unit 105 changes the attribute value of a selected pixel with a greater convolution value to an attribute value closer to the text processing, because the closer a pixel is to a pixel set to "attribute error contained" and the larger the number of edge pixels surrounding the pixel, the greater the convolution value. The attribute deciding unit 105 executes the foregoing processing on each pixel.

FIG. 12 is a flow chart in which the attribute deciding unit 105 decides the attribute value of a pixel with the attribute value set to "photograph" and "attribute error contained." In step S1201, the attribute deciding unit 105 selects pixels one by one starting from the upper left pixel. In step S1202, the attribute deciding unit 105 determines whether the selected pixel is a pixel set to "photograph" and "attribute error contained." If the determination result in step S1202 is false (NO in step S1202), the processing proceeds to step S1205. On the other hand, if the determination result in step S1202 is true (YES in step S1202), then in step S1203, the attribute deciding unit 105 calculates convolution values of pixels surrounding the selected pixel as described above with reference to FIG. 11. In step S1204 following step S1203, the attribute deciding unit 105 decides the attribute value of the selected pixel based on the calculation result and changes the attribute value of the selected pixel to the decided attribute value. In step S1205, the attribute deciding unit 105 determines whether all the pixels are selected. If not all the pixels are selected (NO in step S1205), then in step S1201, the attribute deciding unit 105 selects an unprocessed pixel. The attribute deciding unit 105 executes the foregoing steps S1201 to S1205 on every pixel so that the attribute value of a pixel closer to the pixels set to "edge" and "attribute error contained," among the pixels with the attribute value set to "photograph processing" and the object bit set to "object contained" and the attribute error bit set to "attribute error contained," are changed to the processing closer to the text processing. In the foregoing way, the attribute values of the pixels around the pixels set to "attribute error contained" are gradually switched between the photograph processing and the text processing by the attribute deciding unit 105. Further, a step of determining whether the selected pixel is R=G=B may be included between steps S1201 and S1202 in FIG. 12, and the processing may proceed to step S1205 if the selected pixel is not R=G=B, and the processing may proceed to step S1202 only if the selected pixel is R=G=B.

According to the present exemplary embodiment, the processing close to the text processing is executed on a neighborhood portion of an edge of text drawn by an image draw command to prevent color from appearing on black text.

In an image processing apparatus including a processing unit between the output color processing unit 106 and the halftone processing unit 107 to limit the amount of toner adhering to a CMYK image, processing similar to that of the output color processing unit 106 may be applied to the processing unit. For example, the processing unit includes a toner adhering amount limiting unit for text processing, a toner adhering amount limiting unit for photograph processing, and a mixed unit. The processing unit selects pixels one by one starting from the upper left pixel and inputs color values of a CMYK image of the selected pixel to the toner adhering amount limiting unit for text processing and the toner adhering amount limiting unit for photograph processing.

Next, the processing unit inputs the outputs from the toner adhering amount limiting unit for text processing and the toner adhering amount limiting unit for photograph processing and the attribute value of the pixel, to the mixed processing unit. The processing unit uses color values output from the mixed processing unit as a color processing result of the selected pixel. The processing unit executes the foregoing processing on each pixel and outputs the results as CMYK data.

Other Exemplary Embodiments

The foregoing describes the first and second exemplary embodiments separately. The first exemplary embodiment describes the control in which a pixel of "text attribute" is focused and the attribute of the focused pixel is changed to a different attribute. The second exemplary embodiment describes the control in which a pixel of "photograph attribute" is focused and the attribute of the focused pixel is changed to a different attribute.

Since the pixels to be focused in the two exemplary embodiments are different, it is also suitable to include both features of the two exemplary embodiments.

While the foregoing exemplary embodiments describe a single apparatus which includes each relevant feature, an image processing system may include a plurality of apparatuses which cooperate together to realize the necessary features.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-238322 filed Nov. 18, 2013, which is hereby incorporated by reference herein in its entirety.

What is claimed is:

1. An image processing apparatus comprising:
a receiving unit configured to receive print commands for printing a plurality of objects;
a generation unit configured to draw the plurality of received objects to generate a bitmap;
a deciding unit configured to decide an attribute of each pixel contained in the bitmap, from the received print commands;
a determination unit configured to determine whether each pixel contained in the generated bitmap is an edge pixel or not; and
a changing unit configured to change the decided attribute of each pixel based on a result of the determination of whether the pixel is an edge pixel or not,
wherein in a case where the decided attribute of at least one pixel of the bitmap is text and the determination unit determines that the at least one pixel of the bitmap is not an edge pixel, the changing unit changes the attribute of the at least one pixel of the bitmap from text to photograph.

2. An image processing apparatus comprising:
a receiving unit configured to receive print commands for printing a plurality of objects;
a generation unit configured to draw the plurality of received objects to generate a bitmap;
a deciding unit configured to decide an attribute of each pixel contained in the bitmap, from the received print commands;
a determination unit configured to determine whether each pixel contained in the generated bitmap is an edge pixel or not; and
a changing unit configured to change the decided attribute of each pixel based on a result of the determination of whether the pixel is an edge pixel or not,
wherein in a case where the decided attribute of at least one pixel of the bitmap is photograph and the determination unit determines that the at least one pixel of the bitmap is an edge pixel, the changing unit changes the attribute of the at least one pixel of the bitmap from photograph to text.

3. An image processing system comprising:
a receiving unit configured to receive print commands for printing a plurality of objects;
a generation unit configured to draw the plurality of received objects to generate a bitmap;
a deciding unit configured to decide an attribute of each pixel contained in the bitmap, from the received print commands;
a determination unit configured to determine whether each pixel contained in the generated bitmap is an edge pixel or not; and
a changing unit configured to change the decided attribute of each pixel based on a result of the determination of whether the pixel is an edge pixel or not,
wherein in a case where the decided attribute of at least one pixel of the bitmap is text and the determination unit determines that the at least one pixel of the bitmap is not an edge pixel, the changing unit changes the attribute of the at least one pixel of the bitmap from text to photograph.

4. An image processing system comprising:
a receiving unit configured to receive print commands for printing a plurality of objects;
a generation unit configured to draw the plurality of received objects to generate a bitmap;
a deciding unit configured to decide an attribute of each pixel contained in the bitmap, from the received print commands;
a determination unit configured to determine whether each pixel contained in the generated bitmap is an edge pixel or not; and
a changing unit configured to change the decided attribute of each pixel based on a result of the determination of whether the pixel is an edge pixel or not,
wherein in a case where the decided attribute of at least one pixel of the bitmap is photograph and the determination unit determines that the at least one pixel of the bitmap is an edge pixel, the changing unit changes the attribute of the at least one pixel of the bitmap from photograph to text.

5. A method of controlling an image processing apparatus, the method comprising:
receiving print commands for printing a plurality of objects;
drawing the plurality of received objects to generate a bitmap;
deciding an attribute of each pixel contained in the bitmap, from the received print commands;
determining whether each pixel contained in the generated bitmap is an edge pixel or not; and
changing the decided attribute of each pixel based on a result of the determination of whether the pixel is an edge pixel or not,
wherein in a case where the decided attribute of at least one pixel of the bitmap is text and the at least one pixel of the bitmap is determined to not be an edge pixel, the attribute of the focused pixel is changed from text to photograph.

6. A non-transitory storage medium storing a computer-readable program, which when executed by a computer, causes the computer to perform the method according to claim 5.

7. A method of controlling an image processing apparatus, the method comprising:
- receiving print commands for printing a plurality of objects;
- drawing the plurality of received objects to generate a bitmap;
- deciding an attribute of each pixel contained in the bitmap, from the received print commands;
- determining whether each pixel contained in the generated bitmap is an edge pixel or not; and
- changing the decided attribute of each pixel based on a result of the determination of whether the pixel is an edge pixel or not,
- wherein in a case where the decided attribute of at least one pixel of the bitmap is photograph and the at least one pixel of the bitmap is determined to be an edge pixel, the attribute of the focused pixel is changed from photograph to text.

8. A non-transitory storage medium storing a computer-readable program, which when executed by a computer, causes the computer to perform the method according to claim 7.

* * * * *